United States Patent [19]

Borras

[11] Patent Number: 4,665,636

[45] Date of Patent: May 19, 1987

[54] AUTO WHEEL SNOW SCRAPER

[76] Inventor: John Borras, 4526 Bronx Blvd., Bronx, N.Y. 10470

[21] Appl. No.: 800,274

[22] Filed: Nov. 21, 1985

[51] Int. Cl.$^4$ ............................................. E01H 5/04
[52] U.S. Cl. ....................................... 37/234; 37/236; 37/279
[58] Field of Search .................................. 37/231–232, 37/234, 263, 270–271, 279, 214, 218, 220, 235–236, 266

[56] References Cited

U.S. PATENT DOCUMENTS

| 1,749,465 | 3/1930 | Caskin | 37/263 |
| 2,450,905 | 10/1948 | Mork | 37/231 |
| 3,086,303 | 4/1963 | Weeks | 37/234 X |
| 3,289,668 | 12/1966 | Drucker | 37/263 |

FOREIGN PATENT DOCUMENTS

| 558812 | 1/1944 | United Kingdom | 37/279 |
| 195760 | 5/1967 | U.S.S.R. | 37/234 |

Primary Examiner—E. H. Eickholt
Attorney, Agent, or Firm—Richard L. Miller

[57] ABSTRACT

A scraper located in front of each automobile drive wheel to remove snow on the ground, including a scraper blade on a lower end of a piston rod extending from a vertical hydraulic cylinder supported on the vehicle chassis.

3 Claims, 5 Drawing Figures

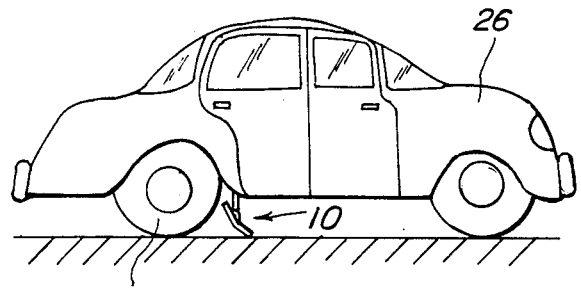
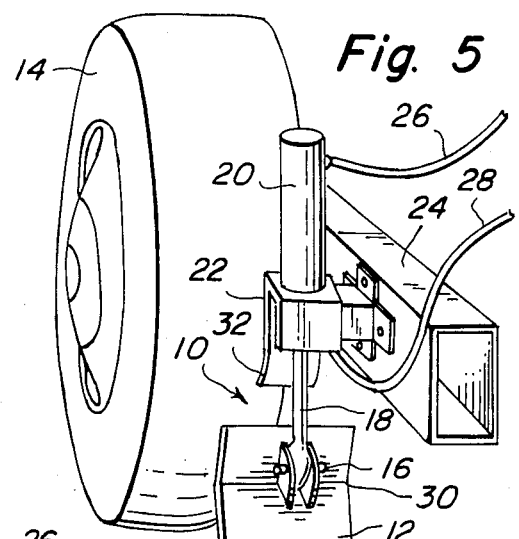
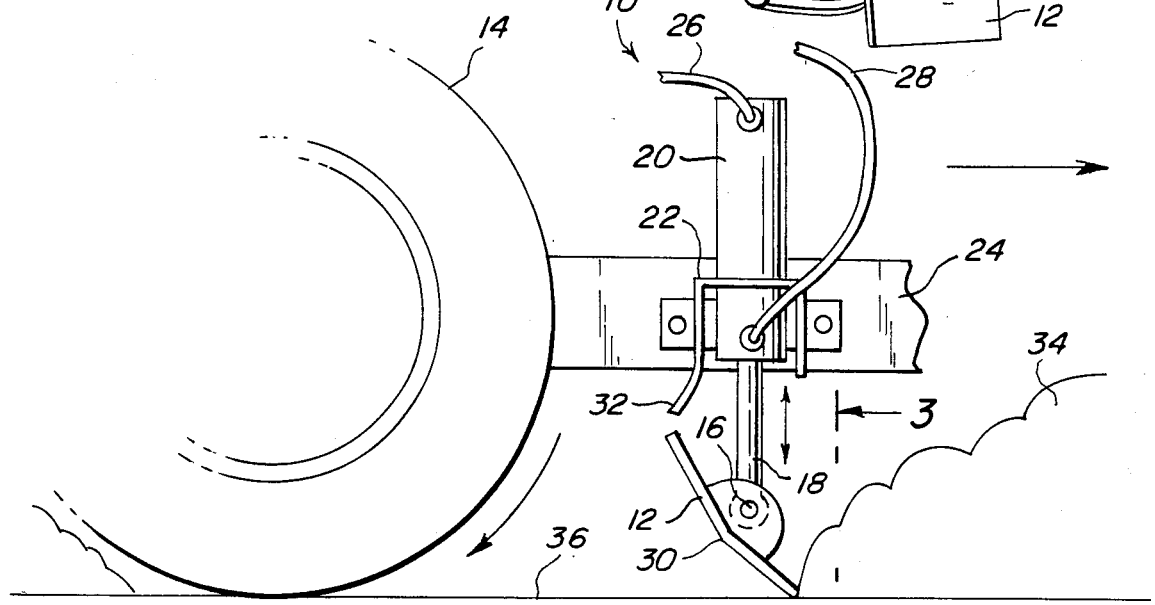
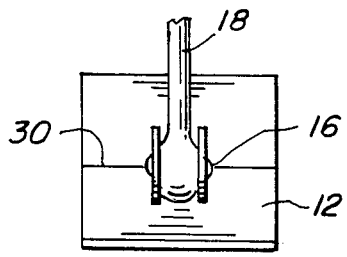
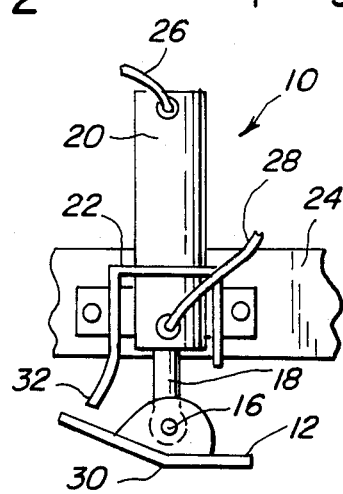

AUTO WHEEL SNOW SCRAPER

BACKGROUND OF THE INVENTION

This invention relates generally to automotive vehicle accessories. More specifically it relates to snow plowing attachments mountable on an automobile.

It is well known experience by most motorists that after a snowfall they must first shovel out their driveway before driving out from their homes. This is a tiring chore, if done by hand, which can be physically dangerous to some individuals, and is time consuming which is objectionable if a person is trying to maintain any kind of schedule; or if awaiting arrival of a snow plow to do the job, there may be a delay as they are busy right after a snowfall. This situation is therefore in need of an improvement.

SUMMARY OF THE INVENTION

Therefore it is a principal object of the present invention to provide a snow scraping accessory mountable on an automobile for scraping snow away from in front of each drive wheel in order that the wheel can have traction with the ground and be able to travel there across for quickly and easily plowing out a driveway path.

Another object is to provide an auto wheel snow scraper which can be conveniently controlled from the dashboard by a motorist without effort, so as to move a plow blade down for use into an operative position or raise it into non-operative position when not needed.

Yet another object is to provide an auto wheel snow scraper which can be useful if traveling into snow covered areas such as unplowed rural roads and the like.

Yet another object is to provide an auto wheel snow scraper which can be incorporated into new car manufacture or readily installed on existing vehicles.

Other objects are to provide an auto wheel snow scraper which is simple in design, rugged in construction, easy to use and efficient in operative use.

Further objects of the invention will appear as the description proceeds.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

BRIEF DESCRIPTION OF THE DRAWING FIGURES

The figures in the drawings are briefly described as follows:

FIG. 1 is a side view of a motor vehicle with the invention mounted thereon.

FIG. 2 is an enlarged side view showing the invention mounted to chassis of a motor vehicle in front of a drive wheel.

FIG. 3 is an end view of the blade taken along line 3—3 in FIG. 2.

FIG. 4 is a partial enlarged side view showing the blade in a raised position when not in use.

FIG. 5 is a perspective view showing the invention mounted to the frame of a motor vehicle.

DETAILED DESCRIPTION OF PREFERRED EMBODIMENTS

Referring now to the Drawing in greater detail, the reference numeral 10 represents an auto wheel snow scraper, according to the present invention, wherein a snow scrapping blade 12 is adjustably positioned in front of each drive wheel 14 of the vehicle. In most cars this is the rear wheel except in cars having a front wheel drive. The blade is pivotally supported on a pin 16 mounted on a lower end of a piston rod 18 projecting from a vertically extending hydraulic cylinder 20 supported in a bracket 22 mounted on the chassis frame 24 of the vehicle 26. Hydraulic lines 26 and 28 connected to opposite ends of the hydraulic cylinder are attached to a pump (not shown) controlled from the dashboard for raising or lowering the blade. In lowered position, the blade may be tilted, by spring means, weight or the like, so that its forward edge scraps the ground for snow removal. The blade in angularly bent about a horizontal bend 30 there across. Each blade is operatively individually controlled. In raised position, a rear end of the blade abuts under a downward projection 32 of the bracket 22, causing the blade to pivot and raise its forward edge, as shown in FIG. 4, for a greater clearance with the ground.

In operative use, the lowered blade scrapes snow 34 away from a path 36 in front of each drive wheel, as shown in FIG. 2.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. An auto wheel snow scraper, comprising, in combination, a blade located in front of a drive wheel of an automotive vehicle, a hydraulic cylinder rigidly supported by a bracket mountable on a chassis frame of said vehicle, and a downwardly extending piston rod from said cylinder to selectively raise or lower said blade between a stored away position and a ground surface, said blade being supported on a lower end of said piston rod, and wherein said blade pivots on a pin mounted on said piston rod lower end, means for downwardly pivoting said blade so that in its lowered position the forward edge of the blade scrapes the ground for snow removal and means coupled to said bracket for upwardly pivoting the forward edge of the blade in its raised position so that the blade provides a greater clearance from the ground.

2. The combination as set forth in claim 1, wherein said cylinder is is a hydraulic circuit with a pump, and control means on a dashboard of said vehicle to operate said pump.

3. The combination as set forth in claim 1, wherein each said blade includes a transverse bend there across.

* * * * *